Sept. 30, 1969  J. J. SIMONEAU  3,469,541
METHOD FOR PREPARING COOKIES FOR PACKAGING AND FREEZING
Filed Oct. 2, 1967  5 Sheets-Sheet 2
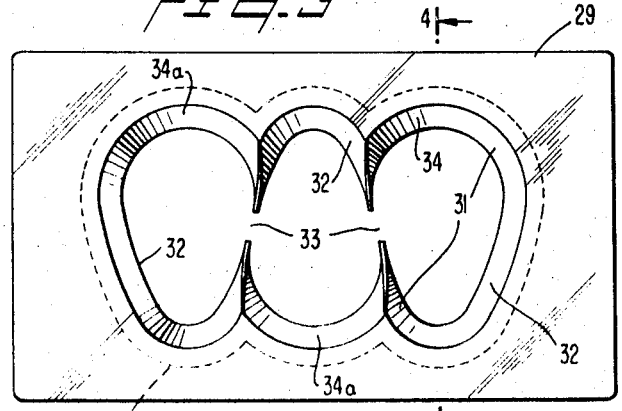
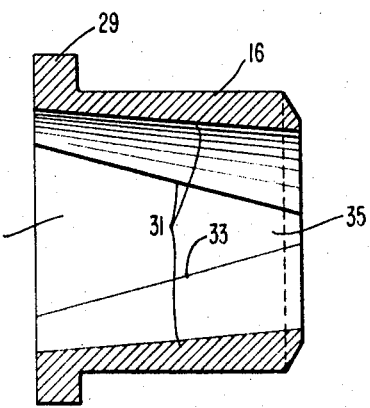
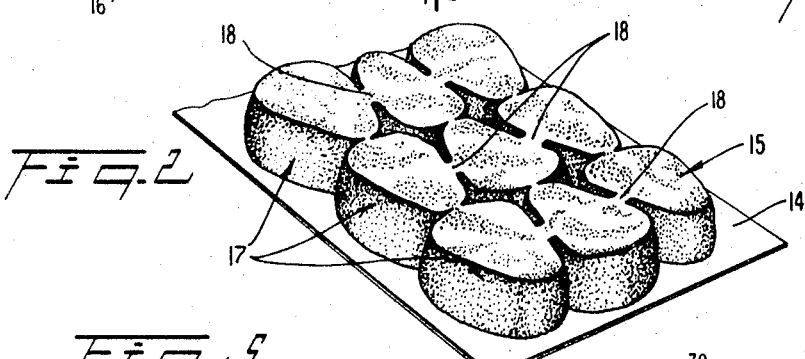
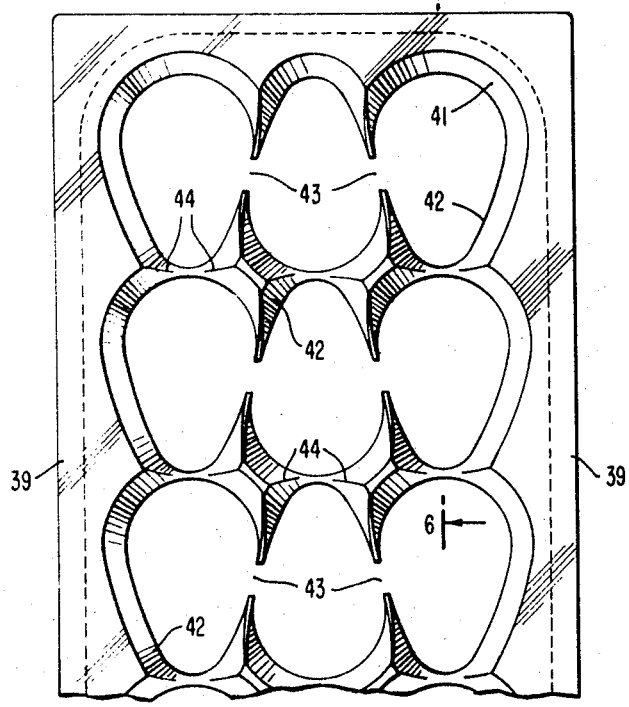
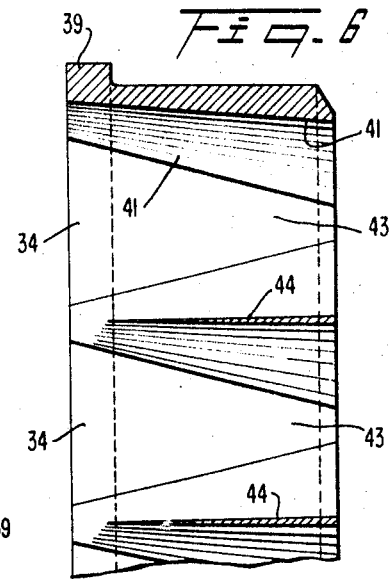
INVENTOR.
JOHN J. SIMONEAU
BY
PATENT AGENT

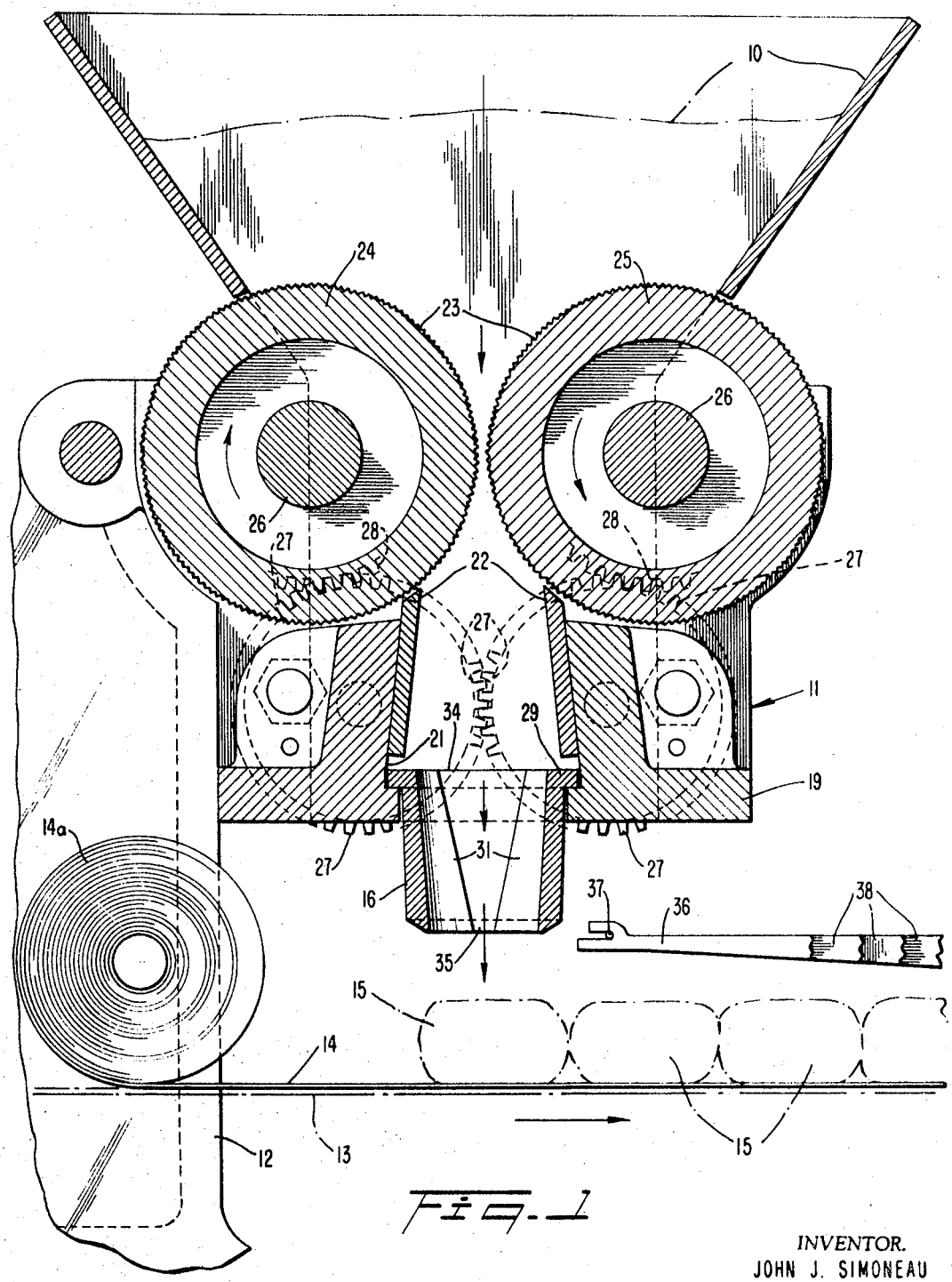

INVENTOR.
JOHN J. SIMONEAU
BY
PATENT AGENT

Sept. 30, 1969     J. J. SIMONEAU     3,469,541
METHOD FOR PREPARING COOKIES FOR PACKAGING AND FREEZING
Filed Oct. 2, 1967     5 Sheets-Sheet 4
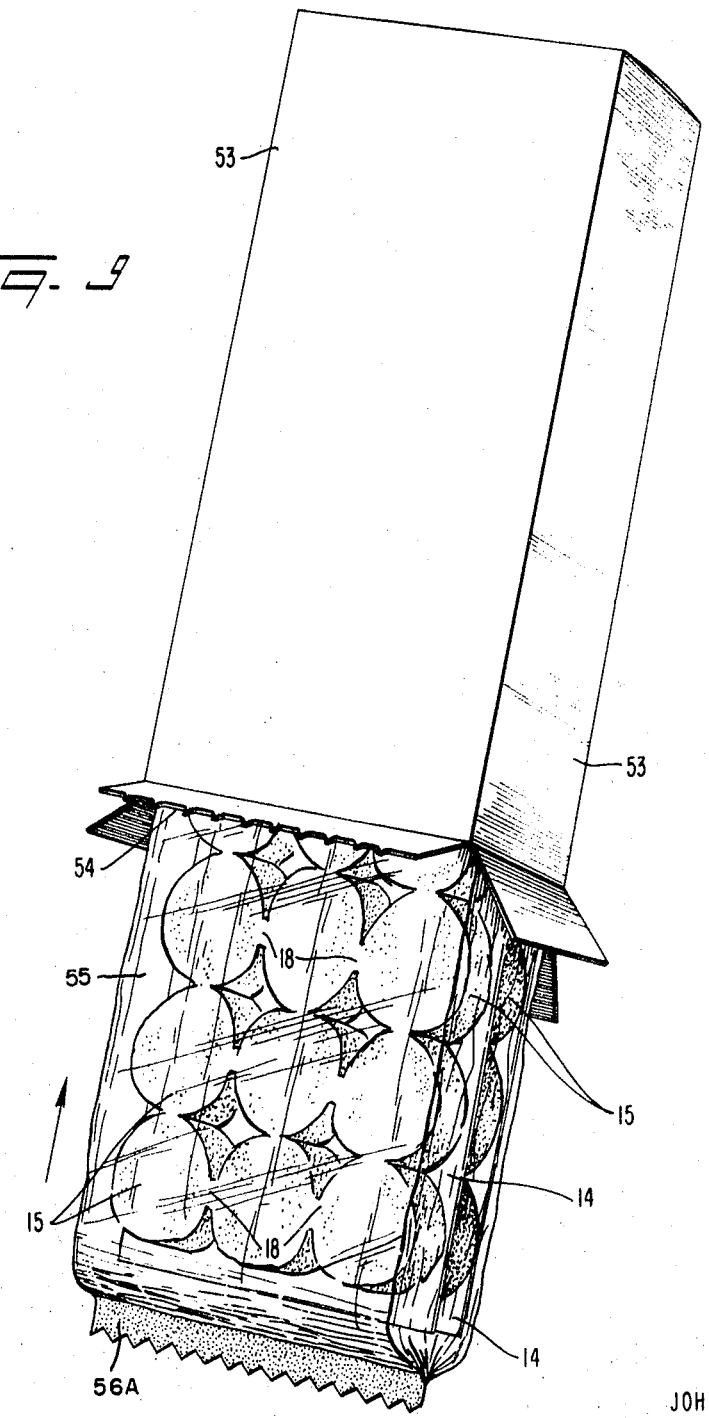
INVENTOR.
JOHN J SIMONEAU
BY
PATENT AGENT Sept. 30, 1969  J. J. SIMONEAU  3,469,541
METHOD FOR PREPARING COOKIES FOR PACKAGING AND FREEZING
Filed Oct. 2, 1967  5 Sheets-Sheet 5
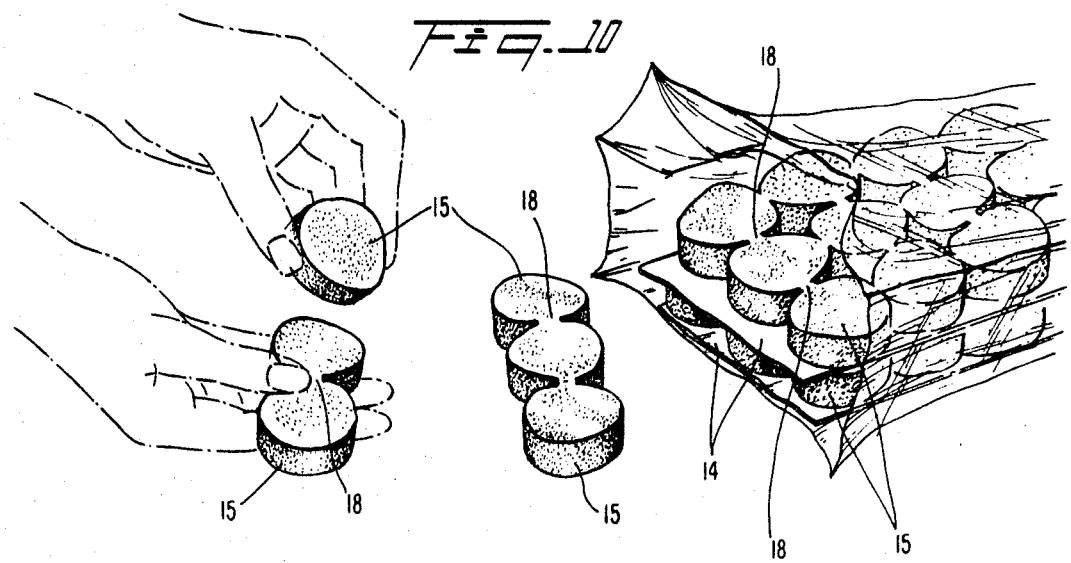
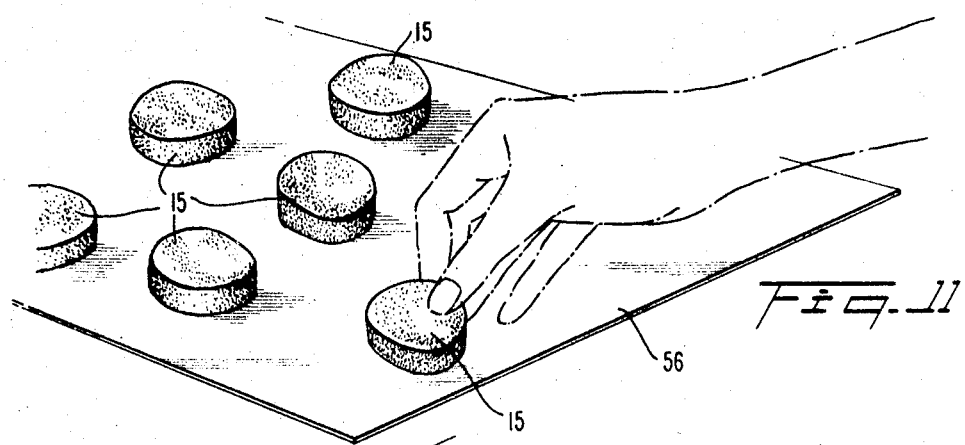
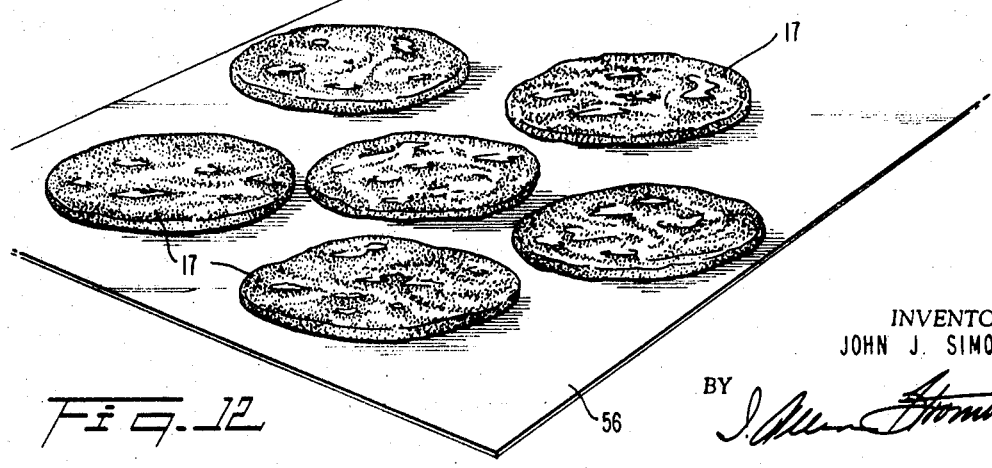
INVENTOR.
JOHN J. SIMONEAU
BY
PATENT AGENT United States Patent Office 3,469,541
Patented Sept. 30, 1969

3,469,541
METHOD FOR PREPARING COOKIES FOR PACKAGING AND FREEZING
John J. Simoneau, Cinnaminson, N.J., assignor to National Biscuit Company, a corporation of New Jersey
Filed Oct. 2, 1967, Ser. No. 672,221
Int. Cl. A21c 11/00
U.S. Cl. 107—54                       6 Claims

ABSTRACT OF THE DISCLOSURE

A method for producing food products so that they can be readily packaged before freezing, and thereafter for baking by the consumer. The formation of the products may be continuous through die extruding means of unique shape and is characterized in that they are extruded in nested form to save packaging space, can be separated into individual pieces without damage and in manufacture can be produced at high speed and in selected groups, as desired.

---

An important object of the invention is to provide die means from which can be extruded a plurality of cookie masses in continuous operation for positioning on a strip of paper or the like to be subsequently frozen and packaged for use by the consumer.

A further object of the invention is the shaping of the product so that massed groups of multiple cookie pieces can be arranged in form for freezing to provide as narrow and compact an arrangement as possible for insertion into a container in which the product is sold.

Still further objects include the arrangement of the individual masses of cookie dough in nested form whereby a package of narrow width may be used with a resultant saving in the cost of packaging; the connection of the individual cookies with narrow bridge portions whereby they can be readily broken apart when frozen; and the lineal positioning of the groups for adhesive contact to further assist in connection and separation thereof to provide the consumer with means for selective choice of a predetermined number of pieces for baking.

With the foregoing and other objects in view, the invention comprises certain constructions hereinafter described and then particularly pointed out in the claims and a preferred embodiment of the invention is illustrated in the accompanying drawings, in which:

FIGURE 1 is a vertical view in section of that part of a machine used in extruding cookie dough, in interconnected sections, through a die section thereof;

FIGURE 2 is a view in perspective of a set of three cookie dough groups that have passed through the dies and are transversely interconnected and are carried on a sheet of packaging material for subsequent freezing;

FIGURE 3 is a plan view of a die used for extruding three cookie dough groups showing the structure of the die for providing a laterally disposed interconnecting bridge between the groups;

FIGURE 4 is a section on the line 4—4 of FIGURE 3 showing the interior tapering walls of the die and the arrangement thereof to provide for the interconnecting bridge between the groups;

FIGURE 5 is a plan view of a die plate having at least three transverse rows of dies therein for the production of the interconnected groups of cookie dough pieces shown in FIGURE 2;

FIGURE 6 is a section on the line 6—6 of FIGURE 5 showing the structure of the die assembly or unit;

FIGURE 9 is a view in perspective of the cookies being inserted into a carton;

FIGURE 10 is combinational view in perspective showing the cookies being removed from a cellophane wrapper after the latter has been withdrawn from a carton in frozen or semi-thawed condition;

FIGURE 11 is a view in perspective showing how the separated cookies are placed on a sheet for baking; and FIGURE 12 is a view in perspective showing the cookies as they would appear after baking.

Figure 7:
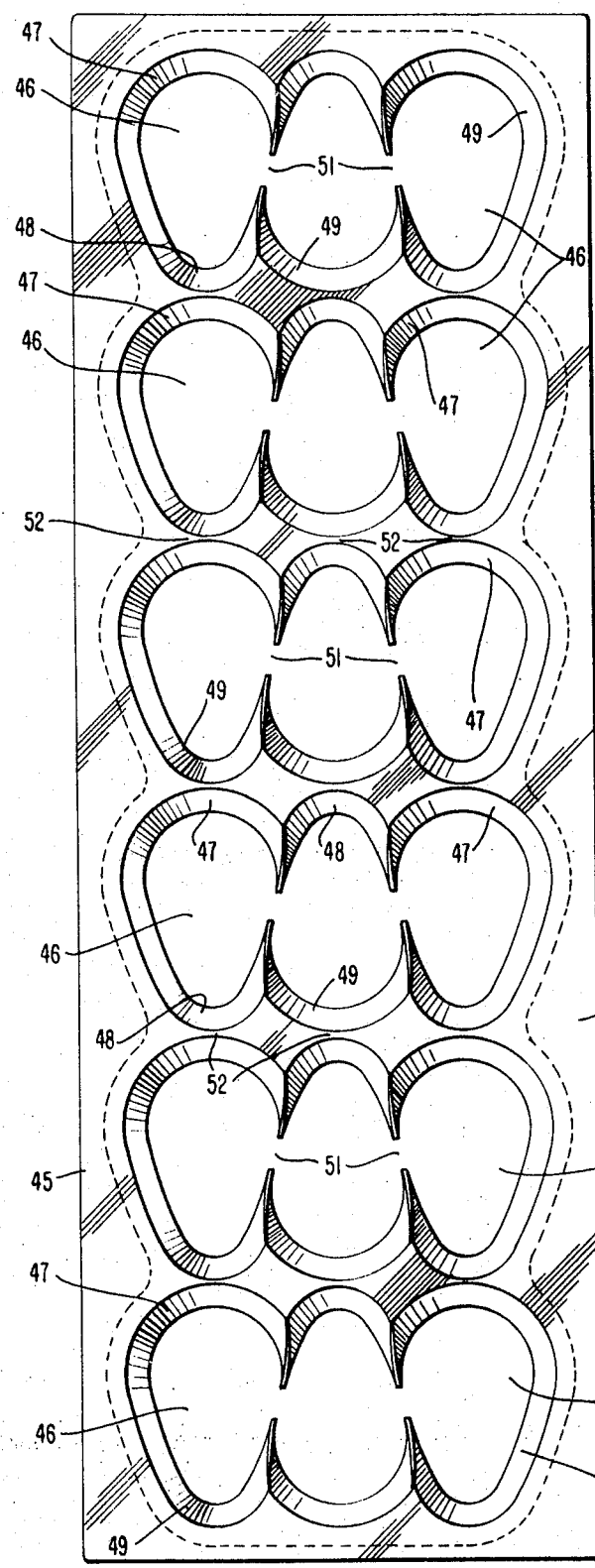
FIGURE 7 is a plan view of a single die plate embodying at least eighteen extrusion die units for the production of a like number of interconnected cookie dough groups which are dropped on a sheet for subsequent freezing.
Figure 8:
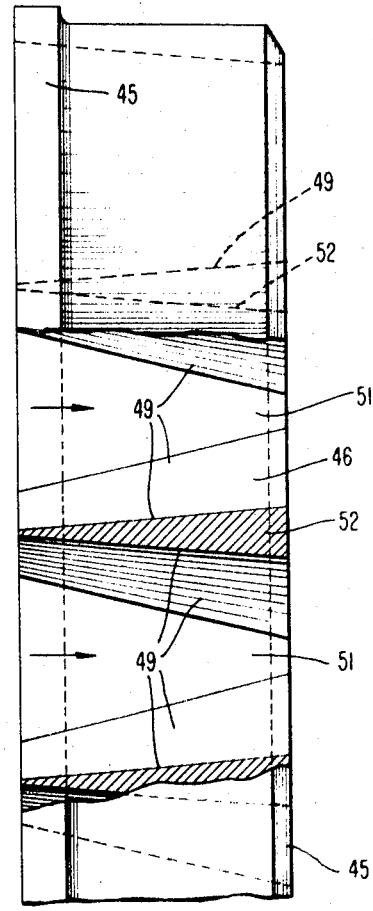
FIGURE 8 is a fragmentary view partly in side elevation and partly in section of a portion of the die plate shown in FIGURE 7.

Referring to the drawings in detail, 10 indicates the hopper of a machine for holding a soft mass of cookie dough from which the product will be formed. The machine, indicated generally as at 11, includes a suitable frame 12 for the support of the hopper 10 which extends transversely of a conveyor belt 13 upon which is carried a strip of paper or other suitable material 14. The paper 14 is unwound from a reel 14a and receives the extruded product, indicated generally as at 15. The paper strip 14 is suitably shaped subsequently, to provide a tray with which the product can be frozen and in which it can be wrapped and put into a carton in its frozen state for use by the consumer. For the purpose of facilitating the packaging operation, the cookie dough is divided by the die 16 into individual cookie groups 17 as shown in FIGURE 2 and each group 17 is connected transversely by bridging sections 18.

While the cookie dough is divided into the groups 17, the pressure of said groups on each other lengthwise thereof, enhanced by a subsequent severing operation causes them to adhere to each other but not to such an extent that they cannot be easily separated by the consumer preparatory to baking and can be readily handled in removal from the conveyor in units of any desired quantity as provided by the manufacturer. In the drawings, the dies have been shown for extruding three, nine or eighteen cookie groups 17 in single operations so that various packagings may be provided for freezing and subsequent use by the consumer.

The frame 12 of the machine supports a die carrier 19 or head which extends transversely of the conveyor belt 13 and thereabove a short distance so that the product, when dropped out of the die, will not be distorted in shape. The machine has been shown schematically and any form of machine may be employed for holding the die, it being understood that while FIGURE 1 shows the die of FIGURE 3 in place, the dies of FIGURES 5 and 7 for nine or eighteen cookie groups would require a longer die seat or receptacle than the die seat or receptacle 21 provided in the head 19. Secured in any suitable manner to the side walls of the receptacle 21 are the doctor blades 22 whose upper edges terminate short of the serrated periphery 23 of the dough feeding extrusion rolls 24 and 25. The latter are mounted on cross shafts 26 journalled in the frame supported die carrier or head 19, to be rotated toward each other, as indicated by the arrows, by the drive gears 27 journalled in the carrier 19 for meshing engagement with the gears 28 secured to shafts 26 for operating the extrusion rolls 24 and 25.

The die 16, taken in combination with the FIGURES 2, 3 and 4, comprises a die plate 29 whose depending body 16 is shaped to provide an annular inner tapered wall 31, of any desired sectional configuration; in this instance a prolate spheroid having somewhat laterally or inwardly directed portions 32 and having the side walls terminating to form a narrow tapered opening 33 to form the bridging sections 18 of the extruded cookie groups 17. These die forms are arranged alternately so that inwardly directed portions 32 nest horizontally with the somewhat semicircular end portions 34a of the die. This nesting of the extruded product provides a compact arrangement of the cookie groups 17, as can be clearly seen in FIGURE 2.

As a mass of dough in the hopper descends between the dough feeding rolls 24 and 25 it is force fed into the die receptacle 21 and into the open top end 34 of the die 16. The pressure continuously applied by the longitudinal flutings or serrations 23 in the rotating rolls or drums 24, 25 forces the dough mass out through the discharge orifice end 35 at the lower end of the die 16. In order to separate the groups, use is made of a cutter 36 having a cross wire 37 supported in the outer ends of spaced cutter arms 38. The latter are suitably mounted for timed reciprocating movement so that the dough mass 17, being extruded, can be quickly and clearly severed to provide the cookies depicted in FIGURE 2 with surface contact at their prolated ends, and with flat surface on opposite faces. The single die member 16 of FIGURE 3 has three die openings through which triple cookie masses 17 are simultaneously extruded. Any number of triple cookie groups can be deposited on the paper 14 as the latter moves along with the belt. By the arrangement shown in FIGURES 5 and 6, the same type of die can be formed in a die plate 39 to provide inner tapered walls 41, inwardly directed portions 42 to provide for the horizontal nesting of the groups, and side bridge forming openings 43. Each die opening, at its opposite prolated ends, except the end openings, is connected by a thin wall 44 which maintains the rounded ends of the groups but is not sufficiently heavy to prevent them from adhering to each other so that an entire group of nine or eighteen cookie pieces can be handled without breaking apart, it having been noted above that the adhesion of the cookies at their ends, even when frozen, offers no resistance to being broken apart when the consumer desires to use only a part of a section of the cookie group.

The foregoing description of the dies, shown in FIGURES 3 and 5 covers the die form shown in FIGURE 7 wherein the die plate 45 of elongated form is shaped to provide die openings 46 of substantially prolate spheroid shape having rounded ends 47 at one extremity and smaller rounded ends 48 at the opposite extremities; the die openings being alternately arranged with the ends 47 flanking an end 48 so that the extruded dough groups will be arranged in nested relation to conserve packaging space and to provide stability in handling. The die openings are cut to provide tapered walls 49 which are interrupted at the sides of the die to provide bridge openings 51 for the same purpose as the openings 33 and 43. In this form of the die structure a wall 52 separates the prolated ends of the die openings 46. While the term prolated spheroid has been employed, it is evident that the cutter 36 will provide upper and lower flat surfaces thereon which is within the definitions of the invention.

In FIGURES 9, 10, 11 and 12 the method of handling the product to complete the operation is illustrated in FIGURE 9, in which a carton 53 is arranged to receive, at an open end thereof 54, a double deck of cookies or extruded products 15 that have been trayed on strips 14 that have been severed from the reel 14a of material (FIGURE 1) and of a shape of proper length and width to be enclosed in superposed relation in a cellophane wrapper 55, sealed as at 56, and when sealed in the carton, are subsequently frozen.

In FIGURE 10 the frozen cookies 17 are removed from the wrapper 55, which may be of any other suitable substance than cellophane, and are broken apart to be placed in spaced relation on a cookie baking sheet 56. As many cookies as desired can be removed from the package and the unused portion then refrozen.

In FIGURES 11 and 12 the spacing of the cookies on the baking sheet 56 are shown and also the cookies after they have been completely baked.

It is evident that the invention provides a food product that can be rapidly formed, packed and frozen and will provide the consumer with a batch of pre-formed cookies of any selected or desired number that can be easily removed from the package in its frozen state, can be broken apart through the bridging sections 18 thereof and can be refrozen after the desired quantity has been selected and without waste and with a minimum of time and effort.

What is claimed is:

1. The method of forming cookies or the like for freezing, which consists in:
   (a) passing plastic dough from a hopper under pressure to be extruded through die means providing such configuration that individual pieces emerge in substantially prolate spheroid shape having laterally disposed bridging connections therebetween,
   (b) severing groups of said pieces with reciprocating cutting means to provide flat surfaces for the upper and lower faces thereof and surface contact at the prolated ends thereof,
   (c) shaping said spheroid masses to provide a large end and a small end and arranged with said small end between flanking large ends to provide a substantially rectangularly shaped group, and
   (d) depositing said severed groups on a conveyor carried strip of material for subsequent freezing and packaging operations.

2. The method of forming cookies or the like for freezing which consists in:
   (a) passing a mass of dough through extruding die means of such configuration that individual groups emerge in substantially prolate spheroid shape connected laterally by bridging connections,
   (b) severing said groups as they emerge from said die means to provide flat faces on the upper and lower surfaces thereof and surface contact at their prolate ends when deposited on a conveyor,
   (c) said groups being each shaped by the die means to provide a large end and a small end arranged with a small end between flanking large ends to provide a substantially rectangularly shaped group, and
   (d) depositing said groups on a conveyor means for subsequent freezing and packaging operations.

3. The method of forming cookies or the like for freezing which consists in:
   (a) passing plastic dough from a hopper under pressure through a die chamber to be extruded through die means providing such configuration that individual pieces emerge in substantially prolate spheroid shape having laterally disposed bridging connections therebetween,
   (b) shaping said pieces by die means to provide a large end and a small end arranged with said small end between flanking large ends to provide a substantially rectangularly shaped group when deposited on said moving strip of material,
   (c) severing groups of said pieces with reciprocating cutting means to provide flat surfaces for the upper and lower faces thereof and surface contact at the prolated ends thereof, and
   (d) depositing said severed groups on a conveyor carried strip of material for subsequent freezing and packaging operations.

4. The method of forming cookies or the like for freezing, which consists in:
   (a) passing plastic dough from a hopper under pressure through a die chamber to be extruded through die means providing such configuration that individual pieces emerge in substantially prolate spheroid shape having laterally disposed bridging connections therebetween, (b) severing groups of said pieces with reciprocating cutting means to provide flat surfaces for the upper and lower faces thereof and surface contact at the prolate ends thereof, (c) depositing said severed groups on a conveyor carried strip of material for subsequent freezing and packaging operations, and (d) depositing one or more strips of material with the groups of pieces thereon in a carton to provide plural decks of said cookies for subsequent separation and baking after defrosting.

5. The method of forming cookies or the like for freezing, which consists in:

(a) passing plastic dough from a hopper under pressure through a die chamber to be extruded through die means providing such configuration that individual pieces emerge in substantially prolate spheroid shape having laterally disposed bridging connections therebetween, (b) severing groups of said pieces with reciprocating cutting means to provide flat surfaces for the upper and lower faces thereof and surface contact at the prolate ends thereof, (c) depositing said severed groups on a conveyor carried strip of material for subsequent freezing and packaging operations, (d) encasing one or more strips of material, with the groups of pieces thereon, in a cellophane wrapper to provide wrapped articles, (e) depositing the wrapped articles in a carton to provide plural decks of cookies for subsequent freezing, and (f) removing the cookies for separation and subsequent cooking.

6. The method of forming cookies for freezing which consists in:

(a) passing a mass of dough through extruding die means of such configuration that successive individual groups emerge in substantially prolate spheroid shape, (b) depositing said individual groups on a conveyor for subsequent freezing and packaging operations, and (c) shaping said spheroid masses to provide a large and a small end and arranged with said small end between flanking large ends to provide a substantially rectangularly shaped group.

References Cited

UNITED STATES PATENTS

| | | | |
|---|---|---|---|
| 239,743 | 4/1881 | Ducsh | 107—29 |
| 249,227 | 11/1881 | Dosh | 107—27 |
| 2,649,379 | 8/1953 | Woods | 99—192 |
| 2,813,033 | 11/1957 | Schneider | 99—172 |
| 2,915,992 | 12/1959 | Gilmore. | |
| 3,106,048 | 10/1963 | Marasso et al. | 53—123 |

WALTER A. SCHEEL, Primary Examiner

ROBERT I. SMITH, Assistant Examiner

U.S. Cl. X.R.

53—123